No. 724,627. PATENTED APR. 7, 1903.
A. D. SWEGLE.
SYSTEM FOR THE ELECTRICAL PROPULSION OF CARRIERS.
APPLICATION FILED JULY 18, 1902.
NO MODEL.
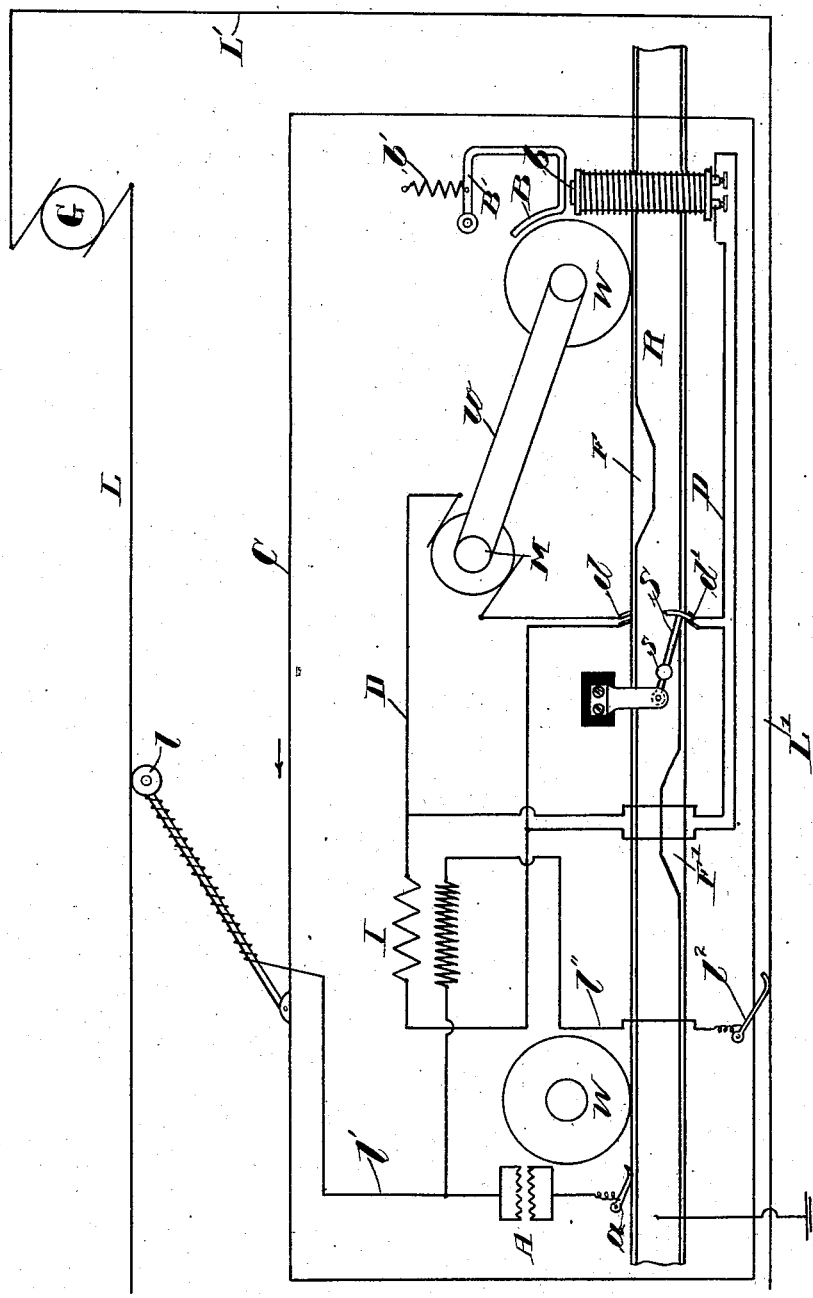
Witnesses:
Inventor:
Abram D. Swegle

UNITED STATES PATENT OFFICE.

ABRAM D. SWEGLE, OF FAYETTE, MISSOURI, ASSIGNOR OF ONE-HALF TO DANIEL A. SWEGLE, OF GALESBURG, ILLINOIS, AND ISAAC L. SWEGLE, OF FAIRVIEW, ILLINOIS.

SYSTEM FOR THE ELECTRICAL PROPULSION OF CARRIERS.

SPECIFICATION forming part of Letters Patent No. 724,627, dated April 7, 1903.

Application filed July 18, 1902. Serial No. 116,128. (No model.)

*To all whom it may concern:*

Be it known that I, ABRAM D. SWEGLE, a citizen of the United States, residing at Fayette, in the county of Howard and State of Missouri, have invented certain new and useful Improvements in Systems for the Electrical Propulsion of Carriers, of which the following is a specification.

The term "carrier" as used in this specification is intended to comprehend any kind of a traveling device, of whatever size, adapted to be used for transportation purposes. It may be a car of large proportions adapted for the transportation of passengers or heavy freight or it may be a car or vehicle of small proportions adapted for the transportation of small light articles. In other applications of even date herewith, Serial Nos. 116,130 and 116,131, I have shown and described a carrier for the transportation of light articles, and it was my purpose primarily to provide means for the rapid transportation of such articles. In my aforesaid application Serial No. 116,130 I have shown, described, and claimed a carrier which is adapted to transport light freight, such as mail-pouches, and automatically deliver it at different points or stations along an established line, and in my aforesaid application Serial No. 116,131 I have shown, described, and claimed a carrier adapted to automatically collect light freight, such as mail-pouches, at such stations. In these applications and in the others of even date herewith, bearing Serial Nos. 116,132 and 116,133, the details of a complete system and of the necessary mechanical appliances for handling freight in this way are fully shown, described, and claimed, and reference is hereby made to said applications for a fuller understanding of the mechanism used in carrying out the present invention, which relates to the system of electrical appliances for propelling, stopping, and starting the carrier. I desire to have it understood, therefore, that the present invention is not limited to mechanical appliances of any particular construction, but comprehends only a system including the devices necessary for the purposes herein described.

The accompanying drawing, which is made a part of this specification, is a diagrammatic representation of a system embodying the invention.

The outline of the carrier is shown at C. A rail or track for supporting it is shown at R. This rail or track is preferably constructed as shown and described in my application Serial No. 116,129.

The carrier is preferably supported through the medium of a truck of the construction shown and described in my application Serial No. 116,129. For the purposes of the present case I have diagrammatically shown two of the supporting-wheels at W. The shaft of one of these wheels is suitably geared, preferably through the medium of a sprocket-wheel $w$, with the shaft of an electrical motor M, which is supported by the carrier. This motor is included in the branch D of a circuit which is normally open at the contacts $d$ and which includes one of the coils of a transformer or induction coil I. The other coil of the transformer is included in the circuit of a generator G, which preferably consists of a dynamo located at a power-station. The feeder L delivers its current to the transformer through a trolley $l$ and a wire $l'$, and after passing the transformer the current is returned to the generator through a wire $l''$ and a contact $l^2$, which contacts with the returned wire L'.

The contacts $d$ are adapted to be closed by a switch S, of any suitable construction, carried by and insulated from the carrier. In the drawing I have shown the switch as consisting of a pivoted arm having an antifriction-roller $s$, which is adapted to contact with one or the other of two reversely-arranged tripping inclines or cams F and F'. The trip F' is so disposed that as the car advances in the direction of the arrow the roller $s$ will impinge upon it, and the switch will be automatically thrown into position to close the motor-circuit at $d$. The motor will under this condition be supplied with current for propelling the carrier. The trip F is so disposed that when the roller $s$ impinges upon it the switch will be moved to open the motor-circuit at $d$ and close a second circuit D' at $d'$. This second circuit also includes the aforesaid coil of the transformer and includes the coil of an electromagnet BM, which controls or applies the brake B. The shoe of the brake is carried by a lever B', which also carries the armature b of the magnet BM, so that when the magnet is energized the armature will be attracted and the brake-shoe will be drawn into contact with the braking-surface in opposition to the resistance of a spring b', which normally holds the brake off. With such a system having a divided circuit, one portion of which includes the motor and the other portion of which includes the brake-magnet, and having also the switch arranged to reciprocally close one or the other of said circuits, the carrier can be automatically stopped at any desired point along the line. When it is again started, either manually or by any suitable means, the trip F' will again automatically open the circuit through the brake-magnet and establish the circuit through the motor.

For protecting the electrical appliances above described from the injurious effects of heavy currents the wire l' is carried to a potential discharger or arrester A, which in turn is grounded, preferably, through the medium of a movable contact a, supported by the carrier and contacting with the rail R.

Having thus described my invention, the following is what I claim as new therein and desire to secure by Letters Patent:

1. In a system for electrical propulsion of carriers, the combination of a carrier, a motor supported thereby and suitably geared with the traction-wheel thereof, an electromagnetic brake device supported by the carrier, circuits including the motor and brake-magnet, means for supplying said circuits with current, a device adapted to operate reciprocally for controlling said circuits, and means for automatically operating said device at a predetermined point, substantially as described.

2. In a system for electrical propulsion of carriers, the combination of a carrier, a motor supported thereby and suitably geared with the traction-wheel thereof, an electromagnetic brake device supported by the carrier, circuits including the motor and brake-magnet, means for supplying said circuits with current, a switch supported by the carrier and adapted to control said circuits, and a stationary trip for operating said switch, substantially as described.

3. In a system for electrical propulsion of carriers, the combination of a carrier, a motor supported thereby and suitably geared with the traction-wheel thereof, an electromagnetic brake device supported by the carrier, normally open circuits including the motor and brake-magnet, means for supplying the said circuits with electricity, a switch supported by the carrier and adapted to control said circuits, and reversely-arranged stationary trips for automatically operating said switch, substantially as described.

4. In a system for electrical propulsion of carriers, the combination of a carrier, a motor supported thereby and suitably geared with the traction-wheel thereof, an electromagnetic brake device supported by the carrier, circuits including the motor and brake-magnet, a transformer supported by the carrier, one coil of the transformer being included in the aforesaid circuits, a stationary source of electricity, a feeder leading therefrom, a movable contact supported by the carrier and contacting with said feeder, and a wire leading from said contact to the other coil of the transformer, substantially as described.

5. In a system for electrical propulsion of carriers, the combination of a carrier, a motor supported thereby and suitably geared with the traction-wheel thereof, an electromagnetic brake device supported by the carrier, normally open circuits including the motor and brake-magnet, a switch adapted to reciprocally open and close said circuits, reversely-arranged stationary trips for controlling said switch, a transformer supported by the carrier, one coil of the transformer being connected with the aforesaid circuits, a stationary source of electricity with which the other coil of the transformer is connected, and an arrester supported by the carrier and electrically connected in the circuit between the source of electricity and the transformer, substantially as described.

ABRAM D. SWEGLE.

Witnesses:
L. H. JELLIFF,
LE ROY WHARTON.